April 23, 1940.  R. P. KOEHRING  2,198,254
METHOD OF MAKING COMPOSITE METAL STRUCTURES
Original Filed Aug. 7, 1936
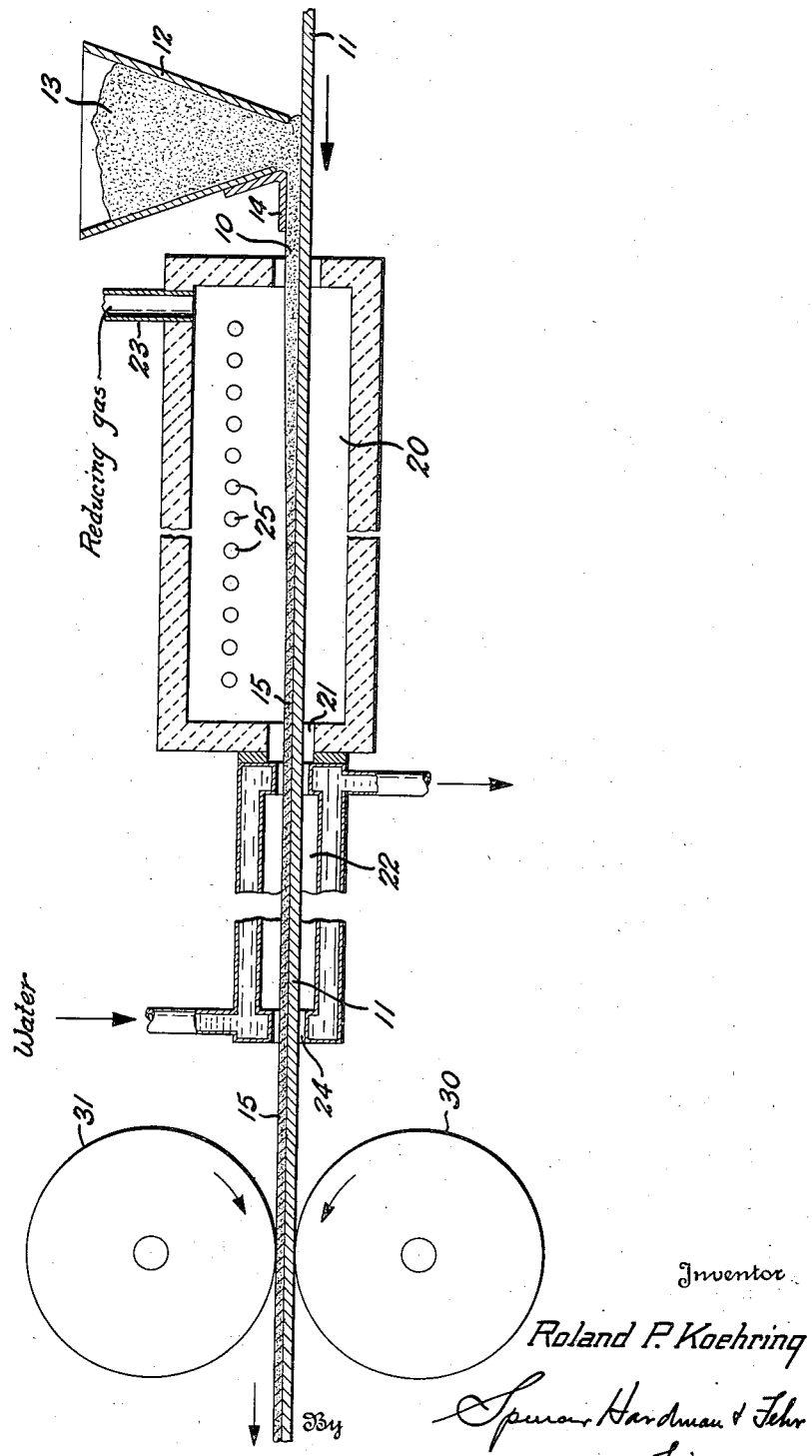
Inventor
Roland P. Koehring
Spencer Hardman & Fehr
his Attorneys

UNITED STATES PATENT OFFICE 2,198,254

METHOD OF MAKING COMPOSITE METAL STRUCTURES

Roland P. Koehring, Dayton, Ohio, assignor to General Motors Corporation, Detroit, Mich., a corporation of Delaware Application August 7, 1936, Serial No. 94,733
Renewed January 4, 1940

12 Claims. (Cl. 75—22)

This invention relates to metallic bearing structures and to the methods for making same. By "bearing structures" is meant any element designed for rubbing contact upon some other solid surface and this term as used herein is intended to include anti-friction bearing elements of all kinds and also friction elements such for instance as are used in clutches and wheel brakes on automobiles.

This application is a continuation in part of my prior application S. N. 85,297, filed June 15, 1936, for Method of making composite metal bearing elements. In said prior application there is disclosed a method of first forming a porous matrix lining of suitable metal, for example copper, molecularly bonded to a reinforcing metal back such as steel, and thereafter impregnating said matrix lining with material having suitable frictional characteristics, for example molten lead in the case of bearings or molten litharge in the case of brake and clutch linings, or with both lead and litharge to provide a final bearing structure having a metal matrix having the impregnating material very finely and uniformly dispersed throughout it.

This present application carries forward said prior disclosed method by the herein disclosed method of impregnating a finely porous Cu matrix with pure tin, lead-tin alloys, lead-antimony alloys, lead-tin-antimony alloys, tin-antimony alloys, or other low-melting metals or alloys, including bismuth, silver, cadmium, tellurium, calcium, etc., all in any desired useful proportions, without harmful alloying of these impregnating metals with the Cu matrix. The above named impregnating metals or alloys cannot be soaked into a finely porous Cu matrix by the high temperature method disclosed in said prior application S. N. 85,297, due to the fact, that, unlike lead or litharge, these metals have a much greater alloying affinity for copper and hence have a great tendency to dissolve and destroy the network form of the porous Cu matrix.

Now a feature of the method of this invention is the prevention of any substantial dissolving and consequent destruction by the above impregnating metals of the network form of the finely porous Cu matrix regardless of their great tendency to dissolve Cu when raised to higher temperatures. Such dissolving of the Cu matrix by these molten impregnating metals is prevented or very materially retarded by maintaining the impregnating metal only slightly above its melting point during the impregnating step. Further, according to this invention when such relatively low temperatures are used the porous Cu matrix is first thoroly impregnated with a suitable fluxing material in order to obtain the desired wetting action and consequent good impregnation of the molten impregnating metal into which the matrix is immersed. The teachings of this invention also apply to porous metal matrices other than Cu, for instance, pure iron, or pure nickel, or copper-nickel alloys, or copper-iron alloys.

Therefore the general object of this invention is to provide a composite bearing structure having an initially-formed finely porous metal matrix which is subsequently impregnated without destruction of its porous network form with a molten lower-melting metal or alloy of such nature that it has a strong tendency to dissolve and change the network form of said porous matrix when impregnated, and so raises the problem of maintaining the porous matrix in its finely porous form during the impregnation step.

According to my said prior application S. N. 85,297, a porous Cu matrix which has its finely dispersed interconnecting pores completely or partially filled by impregnation with lead forms a very good bearing lining for many uses. Such linings are readily machineable, have good resistance to scoring, are soft enough to have conformability and to enable dirt or hard foreign particles to be readily imbedded into the bearing surface and so avoid scoring of the shaft. They have good resistance to pounding and fatigue, and good anti-friction properties, and if desired may be very strongly bonded to a reinforcing steel back by first bonding the porous Cu matrix to the steel back prior to the step of impregnating said Cu matrix with molten lead.

However it has been found that copper-lead bearing linings (wherein the intersticial metal is unalloyed lead) do not have good resistance to the corrosion effects of certain acids occurring in the lubricating oils used therewith. It has been found that present day engine lubricating oils regardless of their initial purity become somewhat acid after a period of use due, it is believed, to an oxidation of the lubricating oil under the heat and other conditions of use of automobile engines.

This present invention teaches that this intersticial lead can be made corrosion-resisting by the addition of various lead-alloying metals such as tin, antimony, bismuth, silver, cadmium, tellurium, calcium, etc., in any desired useful proportions or combinations. In other words, this this invention teaches that unalloyed intersticial lead in a porous metal matrix is subject to serious corrosion effects in oil-lubricated automobile engine bearings, but that when the interstitial lead is alloyed with one or more other metals with which lead has an alloying affinity the corrosion-resistance of the bearing lining is very greatly improved.

However when impregnating a finely porous Cu matrix with a molten alloy of lead and any other metal which has a substantial alloying affinity for Cu, a serious problem arises due to the fact that the molten impregnating metal alloy itself does not merely soak into the porous Cu matrix (as is the case with unalloyed lead) but also will normally alloy with and hence at least materially dissolve the porous Cu matrix upon contact therewith and so destroy the original finely porous form of the Cu matrix. It is desired to maintain the finely porous Cu matrix unchanged in form during the impregnating step in making bearings according to this invention. The method disclosed in detail herebelow shows how this difficult problem is solved.

Further objects and advantages of the present invention will be apparent from the following description, reference being had to the accompanying drawing wherein a preferred embodiment of the present invention is clearly shown.

In the drawing:

The figure is a diagrammatic view illustrating a method of applying a loose uncompacted layer of metal powder upon a relatively strong metal back and sintering this loose layer in situ upon the metal back to form a porous metal matrix lining strongly bonded to the back.

Referring to the drawing, a loose layer 10 of desired thickness of the finely divided matrix-forming metal powder is applied onto a relatively strong metal strip 11, such as steel, as the strip 11 moves along under the hopper 12 at a suitably slow uniform speed. The loose matrix-forming metal powder 13 in hopper 12 runs out by the aid of gravity upon strip 11 and is preferably smoothed out by a suitable adjustable smoothing device 14 to provide a smooth-surfaced uniform layer 10 of loose metal powder.

The moving metal strip 11 with the loose layer 10 therein passes into the sintering chamber 20 and is there heated in a reducing atmosphere to such a temperature and for such a time period as will cause the loose or only slightly compacted metal particles to molecularly bond together and form a strong highly porous matrix lining 15 and at the same time to molecularly bond to the metal strip 11. During this sintering process the thickness of the loose powder layer 10 is materially reduced so that the porous metal lining 15 emerging at 21 from the sintering chamber 20 is about one-third less than the loose powder layer 10 which enters chamber 20. Hence the original thickness of the powder layer 10 is made such as will give the desired thickness and density of the sintered porous metal matrix lining 15. This can be readily determined by trial for any given ingredients in the matrix-forming metal powder 13. If strip 11 is of steel it is preferably but not necessarily first copper plated before the loose powder layer 10 is applied thereon since it has been found that the sintered porous lining 15 will bond somewhat more strongly to a copper surface than it will to a steel surface. However the porous matrix lining 15 will bond successfully to an uncoated clean steel surface.

The highly porous matrix lining 15 passes from the hot sintering chamber 20 into the water-jacketed cooling chamber 22 where it is cooled in a dried reducing atmosphere to prevent rapid oxidation of the porous metal such as would occur if it be exposed to room atmosphere when still very hot. Reducing gas is constantly supplied to chamber 20 thru duct 23 and so prevents entrance of room atmosphere therein. Reducing gas passes from chamber 20 into the cooling chamber 22 and thence out thru exit opening 24. A suitable reducing gas for this method may be made by incompletely burning natural gas with air (preferably about 7½ parts air to 1 part of natural gas) and then removing the water vapor of combustion by condensing the water vapor by refrigeration until there remains only about three-tenths of a pound of water vapor in 1000 cubic feet of the reducing gas. The dried reducing gas is then passed into sintering chamber 20 thru duct 23 where it is reheated to the accurately controlled desired sintering temperature by the electric heater elements 25, or any other suitable heating devices.

The density or porosity of the porous matrix lining 15 may be accurately controlled if desired by a subsequent sizing or pressure operation, such for instance as passing the strip 11 with the porous lining 15 bonded thereto between pressure rolls 30, 31, as illustrated at the left side of the figure of the drawing. This sizing operation may be followed by a second heat treatment in a reducing atmosphere if it is deemed advisable to anneal and thereby strengthen the porous matrix lining after such substantially cold working thereof. Or if desired, porous lining 15 may be sized to any desired porosity and thickness by subjecting it to a similar hot-rolling step by passing the strip between similar pressure rolls mounted within and adjacent the exit end of chamber 20, or within chamber 22, or within a heated chamber located between chambers 20 and 22, before the strip is cooled. Also if desired, the loose powder layer 10 may be partially compacted to any desired degree prior to sintering same by passing strip 11 with the loose layer 10 thereon thru similar pressure rolls located between the distributing hopper 12 and the sintering chamber 20. Of course both sides of the back strip 11 may have a porous matrix lining 15 bonded thereto simply by first applying the porous lining on one side thereof and then repeating the above method for applying a porous lining on the other side.

According to this present application, the following finely powdered matrix-forming materials 13 may be strongly bonded to a plain or to a copper-plated steel strip 11 by the above described method:

(1) Pure copper powder.
(2) Pure iron powder.
(3) Pure nickel powder.
(4) Copper-nickel alloys in any proportion.
(5) Copper-iron alloys.
(6) Copper powder containing any desired proportion of a non-metallic ingredient such as powdered graphite, the non-metallic content used being dependent on the use to which the bearing structure is put. The addition of up to 6% graphite materially reduces galling and wearing away of the final bearing element made by the complete process of this invention.

In above Formulas 1, 2, 3, and 6, only one metal powder is used instead of two and hence during sintering in chamber 20 there can be no alloying together of two metals having differing melting points such as occurs in well-known sintering processes. When only copper powder is used for the metal powder 13 (whether or not there is present any non-metal ingredient such as graphite) in the above described method it is sintered in a reducing atmosphere at about 1900° F. in chamber 20 for about 10 minutes which thus provides a highly porous copper lining 15 molecularly bonded to the steel strip 11. Copper melts at 1980° F. and hence if heated in chamber 20 at this temperature the copper powder will melt and flow together and thus the desired porous structure will be destroyed. I have found however that it is unnecessary to raise finely divided copper powder to its melting point in order to cause the contacting copper particles to molecularly bond together, and that this may be done by the above method at a temperature as low as 1900° F. The contacting copper particles seem to simply grow together by a grain growth when maintained at this temperature in the above-described reducing atmosphere and thus provide a relatively strong finely porous copper matrix with copper as the only metal constituent.

When only pure iron powder or pure nickel powder is used for the matrix-forming powder 13 in the above method it is similarly sintered in chamber 20 at a temperature somewhat below its melting point, preferably about 2100° F., to form a relatively strong finely porous matrix with only one metal constituent.

The following is given as a specific example: After a porous copper matrix lining 15 is bonded to a copper-plated steel strip 11 as above described, its porosity may be controlled to the precise degree desired by passing it between pressure rolls 30, 31, or by any other suitable pressing operation. The composite strip is then soaked in a suitable liquid flux preferably containing zinc chloride, ammonium chloride, hydrochloric acid and water, or in some of the commercial fluxes containing one or both of the above salts in the higher boiling alcohols. The flux should be made to thoroly enter and wet the interstices in the porous Cu matrix in order to facilitate and greatly increase the rapidity of the subsequent entrance and wetting action of the impregnating metal. The thoroly fluxed composite strip is then completely immersed in a molten bath of the impregnating metal with which the Cu matrix is to be impregnated, the molten impregnating bath being maintained just above its melting point in order to substantially prevent the dissolving action of the impregnating metal upon the porous Cu matrix. The molten impregnating metal very rapidly enters and fills the interstices in the Cu matrix and displaces the flux therein which rises to the surface of the molten metal bath. As soon as no more flux is seen to come to the surface of the bath, the now metal-impregnated porous Cu matrix is removed from the bath and the composite structure rapidly cooled to solidify the impregnating metal. The total time period of contact of the porous Cu matrix with the molten impregnating metal should be as short as possible consistent with the desired degree of impregnation by the impregnating metal if the particular molten impregnating metal used has a rapid dissolving action on the Cu matrix when maintained just above its melting point. Some desirable impregnating metals or alloys have such a substantial tendency to dissolve the Cu matrix during the above-described impregnating step that they at least partially destroy its original porous form. In such cases this undesirable dissolving effect on the porous Cu can be greatly lessened simply by adding more or less Cu to the molten impregnating alloy itself prior to the immersion of the porous Cu matrix therein. The amount of Cu to be so added for the best final results may be very readily determined by simple trial for any given impregnating alloy or metal. As stated in my prior application S. N. 85,297, pure lead when used as the impregnating metal will not dissolve the Cu matrix at the impregnating temperature of 1500° F. but will dissolve Cu at 1760° F. and above. However when tin, antimony, bismuth, silver, cadmium, tellurium, calcium, etc. are used as the impregnating metal, either alone or alloyed with lead, or in most any combination with each other, there is a q ie definite temperature at which such molten impregnating metals will begin to materially dissolve the porous Cu matrix and so destroy its original porous form. If any such impregnating metals or desirable alloys thereof have a too serious dissolving action on the porous Cu matrix when maintained just above the melting point thereof, this dissolving action can be greatly lessened, or substantially prevented in many cases, simply by the addition of a suitable percentage of Cu to the impregnating metal, as stated above. This addition of some Cu to the molten impregnating metal seems to materially satisfy its appetite for Cu (so to speak) and hence greatly lessens its dissolving action during the impregnating step on the porous Cu matrix, which it is desired to maintain in its original finely porous form.

After the final metal-impregnated Cu matrix 15 is cooled and fractured cross-wise thereof, a microscopic examination clearly shows that the impregnating metal readily penetrates all the way thru the Cu matrix and fills the intercommunicating pores thereof, thus giving substantially the same micro-structure as a porous Cu matrix filled with pure lead but having in the place of the relatively corrodible pure lead, any desirable alloy of lead with tin, antimony, cadmium, bismuth, silver, tellurium, calcium, etc., or any other alloy of any combination of these metals which may be suitable for a specific purpose. Obviously pure lead may be used as the impregnating metal in the method of this application as well as in the high temperature method disclosed in my application S. N. 85,297 in any case where pure lead is desired for any reason. I will not attempt herein to specify the numberless low-melting alloys, either in ingredients or proportions, which may be used as the impregnating metal in a porous Cu matrix by the above-described method. So far as my experiments prove, a porous Cu matrix may be impregnated by the above-described method with any unalloyed single metal, or any metal alloy, whose melting temperature is considerably below that of pure Cu and which has at least some wetting action when in molten state upon a clean suitably fluxed solid copper surface. In other words, I have discovered a method of making composite metal structures which at once opens up a wide field of experiment and trial which may be necessary to determine the most useful impregnating metals and alloys for any specific purpose or use, whether for anti-friction use as in most normal bearings, or for high-friction use as in clutch or brake elements of various kinds. A finely porous Cu matrix may be impregnated with the following impregnating metals by the above described method to form useful corrosion-resisting anti-friction bearing linings for various uses. Experiments show that Formulas 1 to 4 below are particularly suitable for the main and connecting rod bearings for present day automobile engines:

1. Lead-tin alloys in any proportions.
2. Lead-antimony alloys containing from 1% to 10% antimony.
3. Lead-tin-antimony alloys, containing 1% to 10% antimony and tin in any proportion.
4. Tin-antimony alloys, containing from 1% to 8% antimony.
5. Tin-copper alloys containing up to 10% copper.
6. Pure tin.

As indicated hereinbefore, the above are given as illustrations only and in no way should be considered as limitations to the useful ingredients or proportions which may be used according to the teachings of this invention. This method produces by a relatively simple workable procedure a good high-duty antifriction bearing for such applications as automobile engine connecting-rod and main bearings. It makes possible the use in a porous Cu matrix of an impregnating metal as high in lead content as desired but which is far more corrosion-resisting than unalloyed lead under the corrosive effects of the engine oil, made so by alloying the lead with other metals in such a way that said lead-alloying metals do not destroy the original finely porous structure of the Cu matrix.

By the illustrated method of this invention there results a strong finely porous copper matrix 15 which remains strongly molecularly bonded to the backing strip 11 and having any suitable impregnating metal very finely dispersed and uniformly distributed thruout the Cu matrix. As stated above, the porosity of the Cu matrix 15 may be reduced to any desired degree by compacting same after sintering by pressure rolls 30, 31 or other suitable compacting means, and thus the content of the impregnating metal may be readily precisely and uniformly controlled thruout a wide range, say a content of impregnating metal from 10% to 50% or more. Obviously the above-described optional compacting of the matrix-forming metal powder prior to sintering will also reduce the porosity of the Cu matrix. In all bearing linings, whether for friction or anti-friction uses, made according to this invention the proportion and fine distribution of the impregnating metal may be very accurately controlled because the form, density and porosity of the porous metal matrix is completely determined prior to the introduction of the impregnating metal and the subsequent impregnation does not change the physical form of the porous network structure but only fills the interstices therein. This feature permits a precise control over the percentage content of the impregnating metal and also requires its highly uniform dispersion thruout the body of the final bearing lining. The final impregnated lining 15 bonded to its backing strip 11 may be cut into blanks and rolled up into circular form, or half-round form, or shaped into any other desired form of antifriction bearing element or high friction element, as the case may be.

Obviously the fundamental teachings of this invention apply also to a finely porous metal matrix originally formed to any desired shape by the well-known methods of first briquetting metal powders and thereafter sintering the briquettes, and in any case the porous metal matrix may be or may not be molecularly bonded to a reinforcing metal back. While the invention has been primarily described in connection with a porous Cu matrix, its principles and teachings also apply to the other porous matrices described hereinabove, which may be impregnated with lead, tin, antimony, or other lower-melting metals, or various alloys of these metals according to the fundamental teachings of this invention.

While the embodiment of the present invention as herein disclosed, constitutes a preferred form or forms, it is to be understood that other forms might be adopted, all coming within the scope of the claims which follow.

What is claimed is as follows:

1. The method of making a bearing which consists in applying a loose layer of powdered metal to a non-porous reinforcing back of steel or the like, heating the back with the loose powder thereon in a non-oxidizing atmosphere to a sufficient temperature to cause the particles of metal to sinter together into a porous matrix bonded to the back, impregnating the matrix with a soft bearing metal of substantially lower melting point than the metal of the matrix at temperatures but slightly above the melting point of the bearing metal and for a sufficient time only to insure thorough impregnation to prevent or retard the alloying of the soft bearing metal with the matrix, and thereafter cooling the bearing to cause the molten metal to freeze in the pores of the matrix.

2. In the method as defined in claim 1, the additional step of adding to the impregnating bath a proportion of a metal of which the matrix is composed to reduce the dissolving effect of the bath on the matrix.

3. The method of making a bearing which consists in applying a layer of powdered metal to a non-porous reinforcing back of steel or the like, heating the back with the powdered metal thereon in a non-oxidizing atmosphere to a sufficient temperature to cause the particles of metal to sinter together into a porous matrix bonded to the back, impregnating the matrix with soft bearing metal of substantially lower melting point than the metal of the matrix at temperatures but slightly above the melting point of said bearing metal and for a sufficient time only to insure thorough impregnation to prevent or retard alloying of the soft bearing metal with the matrix and thereafter cooling the bearing to cause the molten metal to freeze in the pores of the matrix.

4. The method of making a metallic structure which consists in sintering metal powder together in a non-oxidizing atmosphere to form a porous metal matrix, cooling the sintered matrix in a non-oxidizing atmosphere, immersing the matrix in a bath of molten impregnating material having a tendency to combine with the metal of the matrix, said material including a proportion of a metal of which the matrix is composed to reduce the dissolving effect of the bath on the matrix, maintaining the bath at a temperature but slightly above its melting point and continuing the immersion for but a short time to insure thorough impregnation but prevent any substantial alloying of the impregating material and the matrix, and quickly cooling the impregnated matrix.

5. The method of making a bearing which consists in applying a loose layer of powdered metal to a non-porous supporting back of steel or the like, heating the back with the powdered metal thereon in a non-oxidizing atmosphere to a sufficient temperature to cause the particles of metal to sinter together to form a porous matrix, cooling the sintered matrix in a non-oxidizing atmosphere, immersing the matrix in a bath of molten impregnating material having a tendency to combine with the metal of the matrix, said material including a proportion of a metal of which the matrix is composed to reduce the dissolving effect of the bath on the matrix, maintaining the bath at a temperature but slightly above its melting point and continuing the immersion for but a short time to insure thorough impregnation but prevent any substantial alloying of the impregnating material and the matrix, and thereafter cooling the bearing to cause the molten metal to freeze in the pores of the matrix.

6. A continuous method for making bearing material comprising the steps of applying a loose non-compacted layer of powdered metal continuously to a strong supporting strip of steel and the like, sintering the strip with the loose powder thereon under suitable conditions and at a sufficient temperature to cause the particles of powdered metal to sinter together and form a highly porous strong matrix and simultaneously to cause the matrix to bond in situ to the strip material, impregnating the matrix with a bearing metal having a substantially lower melting point than the metal of the matrix and at a temperature above the melting point of the bearing metal but sufficiently low as not to destroy the continuity of the matrix, and then cooling the impregnated matrix.

7. The method of making a composite metal structure, comprising: the steps of applying a loose non-compacted layer of metal powder to a supporting element of steel or the like, heating the supporting element with the powdered metal thereon under non-oxidizing conditions to a temperature sufficient to cause the powdered metal particles to sinter together and form a porous matrix integrally bonded by an alloy bond to the supporting element then impregnating the porous matrix with a molten softer metal that is soluble in the matrix metal at such a low temperature and for such a time as to prevent dissolution of the matrix whereby the pores of the matrix are substantially filled with the impregnating metal and then cooling the composite structure under conditions which prevent any substantial oxidation of the structure.

8. The steps in the making of composite metal structures, comprising: applying a loose non-compacted layer of metal powder containing a substantial percentage of copper upon a supporting element of steel or the like, heating the element with the loose powder thereon under non-oxidizing conditions and at a temperature sufficient to cause the metal powder particles to sinter together and form a strong highly porous matrix and simultaneously cause the matrix to bond in situ to the element, impregnating the matrix with a soft metal alloy containing a metal from the group consisting of tin, antimony and bismuth at a temperature above the melting point of the soft metal alloy but sufficiently low and for such a short time as to prevent any substantial alloying action of the impregnating metal with the matrix, whereby the matrix is impregnated with the soft metal but the continuity thereof is not destroyed, and then cooling the structure under suitable conditions for preventing substantial oxidation thereof.

9. A bearing comprising a non-porous metal supporting back, a coarse-pored metallic sponge bonded to the back, said sponge consisting of particles of metal loosely applied to the back and sintered to the back and to each other in situ, said sponge having its pores filled with soft bearing metal.

10. A composite bearing element comprising a non-porous ferrous metal supporting back, a cuprous metal sponge of lower melting point than the back sintered to the back in good heat conducting relation, said sponge consisting of particles of metal loosely applied to the back and sintered to the back and to each other in situ, said sponge having its pores filled with soft bearing metal.

11. A composite bearing comprising a non-porous sheet steel supporting back, a metal sponge of lower melting point than the back sintered to the back in good heat conducting relation, said sponge being formed by applying a non-compacted layer of metal particles to the back and sintering them to each other and to the back in situ, said sponge having its pores filled with bearing material of high lead content.

12. A composite bearing element comprising a non-porous ferrous metal supporting back, a copper-nickel alloy sponge of lower melting point than the back sintered to the back in good heat conducting relation, said alloy having good bearing properties and said sponge being formed by applying a non-compacted layer of copper-nickel metal particles to the back and sintering them to each other and to the back in situ, said sponge having its pores filled with soft bearing metal.

ROLAND P. KOEHRING.